United States Patent [19]
Morita

[11] Patent Number: 5,229,905
[45] Date of Patent: Jul. 20, 1993

[54] MAGNETIC TAPE CASSETTE HAVING AN IMPROVED WINDOW DESIGN

[75] Inventor: Kiyoo Morita, Kanagawa, Japan

[73] Assignee: Fuji Photo Film Co., Ltd., Kanagawa, Japan

[21] Appl. No.: 743,063

[22] Filed: Aug. 9, 1991

[30] Foreign Application Priority Data

Aug. 14, 1990 [JP] Japan .................. 2-213635

[51] Int. Cl.$^5$ ............................................. G11B 23/02
[52] U.S. Cl. .................................................. 360/132
[58] Field of Search ........................................ 360/132

[56] References Cited

U.S. PATENT DOCUMENTS 4,452,408 6/1984 Sasaki ........................... 360/132 X
5,023,741 6/1991 Conti et al. ...................... 360/132

FOREIGN PATENT DOCUMENTS 63-293023 11/1988 Japan .
1-146179 6/1989 Japan .

Primary Examiner—John H. Wolff
Attorney, Agent, or Firm—Sughrue, Mion, Zinn, Macpeak & Seas

[57] ABSTRACT

A magnetic cassette having an improved window design resulting from a molding operation. In the method, step portions for supporting at least part of a peripheral edge of a window portion in a direction of thickness of the cassette are formed respectively on a cassette half body and the window portion, and the cassette half body and the window portion are molded integrally with each other by multi-color molding. The primary molding is carried out in such a manner that an inclined portion is formed on an edge of the step portion of the primary resin defining part of a mold cavity for injection-molding a secondary resin and subsequently the secondary resin is injection-molded into the mold cavity, thereby integrally molding the cassette half. In the resulting cassette, the cassette half body and a window portion have respective step portions for supporting at least part of a peripheral edge of the window portion in a direction of a thickness of the cassette, and the cassette half body and the window portion are molded integrally with each other by multi-color molding. An inclined portion is formed on an edge of the step portion of the primary resin.

2 Claims, 5 Drawing Sheets

MAGNETIC TAPE CASSETTE HAVING AN IMPROVED WINDOW DESIGN

BACKGROUND OF THE INVENTION

1. Field of the Invention

The present invention relates to a method of molding a magnetic tape cassette which overcomes a defect in the appearance of the cassette which is produced when forming a cassette half by multi-color molding. The invention also relates to the thus-molded cassette.

2. Background

Generally, a magnetic tape cassette used, for example, with an audio unit, a video unit or the like, has a pair of hubs rotatably housed in a case body composed of upper and lower cassette halves, and a magnetic tape is wound on these hubs.

Generally, the upper and lower cassette halves are injection-molded of a plastics material. Namely, a molten material is injected via an injection gate, such as a direct gate and a submarine gate, into a cavity which is formed by two mold members and corresponds in shape to the cassette half, thereby molding the cassette half. Then, the material filled in the mold cavity is cooled and solidified to provide a cassette half mold product which is removed from the above mold members. Thereafter, in order to achieve a design effect, a paper sheet having a predetermined design is affixed to the outer surface of the cassette half, or a predetermined design is printed directly onto the outer surface of the cassette half.

In order for the condition of winding of the magnetic tape to be visually confirmed from the exterior, the upper and lower cassette halves are made entirely of a light-transmitting material, or as shown in FIG. 8, a transparent or translucent window portion 6 is provided on an opaque cassette half body 2a. In order to achieve the design effect of the case body 1, the window portion 6 is formed into a predetermined shape.

Conventionally, the window portion 6 is composed of a molded window member separate from the cassette half body 2a, and is bonded to the cassette half body 2a by an adhesive, ultrasonic welding or the like. In this case, however, since the steps of molding the window member and of adhesive bonding the window member to the cassette half body are required, the design is limited, and the productivity is poor. Therefore, recently, a production method using two-color molding has been increasingly used.

At present, the most commonly known method of producing the above cassette half by two-color molding is a core back method or a core cavie back method. The process of producing the above cassette by a core cavie back method will now be described with reference to FIGS. 9 and 10.

FIGS. 9 and 10 are cross-sectional views of a cassette half-producing mold taken along a line 9,10—9,10 of the audio compact cassette of FIG. 8. As shown in FIG. 9, the injection mold for the core cavie back method is composed of a fixed mold member 20, a movable mold member 22, a slide cavity 26 provided in a slide hole 24 in the fixed mold member 20, a slide core 30 provided in a slide hole 28 in the movable mold member 22, and a gate block 25 provided in the slide cavity 26. A mold cavity 32 for molding the above cassette half 3a, 3b is formed at the mating surface between the fixed mold member 20 and the movable mold member 22. The slide cavity 26 and the slide core 30 for molding the window portion 6 are projected into the mold cavity 32 and are abutted against each other.

A submarine gate 35, communicating with a runner 33 and a primary hot runner 50 formed in the fixed mold member 20 for injecting a primary opaque or transparent resin, communicates with the mold cavity 32. Additionally, a secondary hot runner 34, formed in the gate block 25 inside the slide cavity 26 of the fixed mold member 20 for injecting a secondary transparent resin, communicates with the mold cavity 32. In FIGS. 9 and 10, the secondary hot runner 34 is formed in the gate block 25.

For molding the cassette half body 2a, the fixed mold member 20 and the movable mold member 22 are mated together, and then the slide cavity 26 and the slide 30 are abutted against each other by a hydraulic drive mechanism (not shown) at a position generally central to the thickness of the mold cavity 32. In this condition, the primary resin is injected from the submarine gate 35. Then, as shown in FIG. 10, the slide cavity 26 and the slide core 30 are retracted to form a window cavity 36, and thereafter the secondary resin is injected from the secondary hot runner 34 into the window cavity 36 to form the window portion 6.

Therefore, the cassette half body 2a and the window portion 6 are welded together and integrally molded together by heat and injection pressure produced during the injection molding. Referring to FIG. 11, in order that the welded portion between the window portion 6 and the cassette half body 2a be able to withstand a force acting in a direction of the thickness, the slide cavity 26 and the slide core 30 are different in size from each other so as to form a step portion 7 on the cassette half body 2a, which step portion corresponds to a peripheral edge portion 8 of the window portion 6, thus providing a double-layer portion formed by the primary and secondary resins.

The problem with such a method of forming the cassette halves 3a, 3b having the window portion 6 formed by such two-color molding, is that a drag 9 is liable to develop particularly at the step portion 7, as shown in FIG. 11. Specifically, before the step portion 7 of the window cavity 36 is adequately cooled, the secondary resin is injected and tends to be distributed over the peripheral edge portion 8. Due to the temperature of this resin and the injection pressure, the step portion 7 accumulates drag and is deformed.

The drag 9 results in a defect in the appearance, such as a striped pattern, and can be viewed through the outer surface of the cassette half 3a, because the window portion 6 is transparent.

SUMMARY OF THE INVENTION

Therefore, an object of the present invention is to overcome the above problem, and more specifically to provide a method of molding a magnetic tape cassette in which a drag is prevented from being formed at a laminate portion of secondary and primary resins during a two-color molding of a cassette half, thereby preventing such a defective appearance, and also to provide such a magnetic tape cassette.

The object of the present invention has been achieved by a method of molding a magnetic tape cassette wherein step portions for supporting at least part of a peripheral edge of a window portion in a direction of thickness of the cassette are formed respectively on a cassette half body and the window portion, and the cassette half body and said window portion are molded integrally with each other by multi-color molding; wherein primary molding is carried out in such a manner that an inclined portion is formed on an edge of the step portion of the primary resin defining part of a mold cavity for injection-molding a secondary resin; and subsequently the secondary resin is injection-molded into the mold cavity, thereby integrally molding the cassette half.

The object of the present invention has also been achieved by a magnetic tape cassette wherein a cassette half body and a window portion have respective step portions for supporting at least part of a peripheral edge of the window portion in a direction of a thickness of the cassette, and the cassette half body and the window portion are molded integrally with each other by multi-color molding; wherein an inclined portion is formed on an edge of the step portion of the primary resin.

DETAILED DESCRIPTION OF THE PREFERRED EMBODIMENTS

An embodiment of the present invention will now be described in detail with reference to the accompanying drawings.

Figure 1:
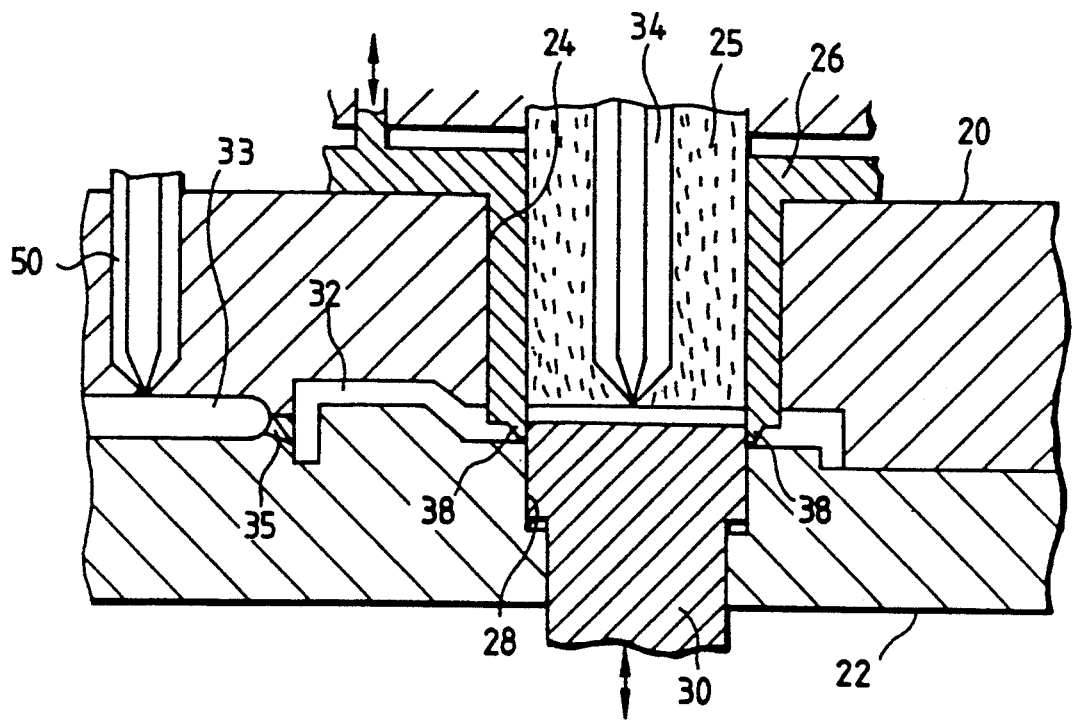
FIGS. 1 and 2 are cross-sectional views of a cassette half forming mold for a magnetic tape cassette according to one embodiment of the present invention.
Figure 2:
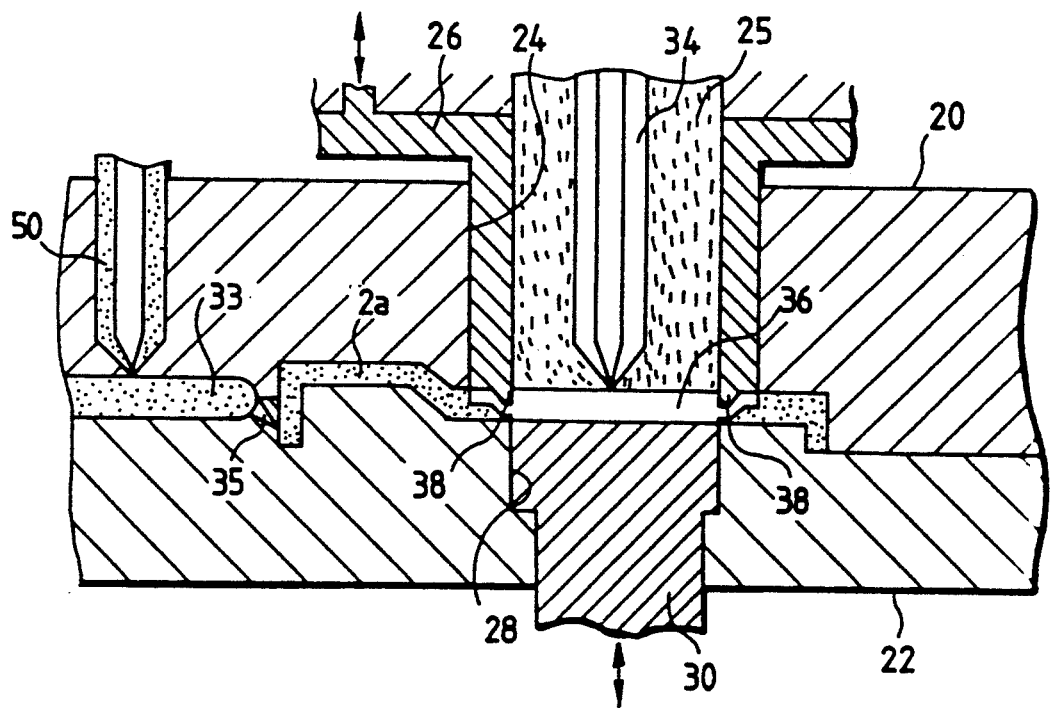
Figure 8:
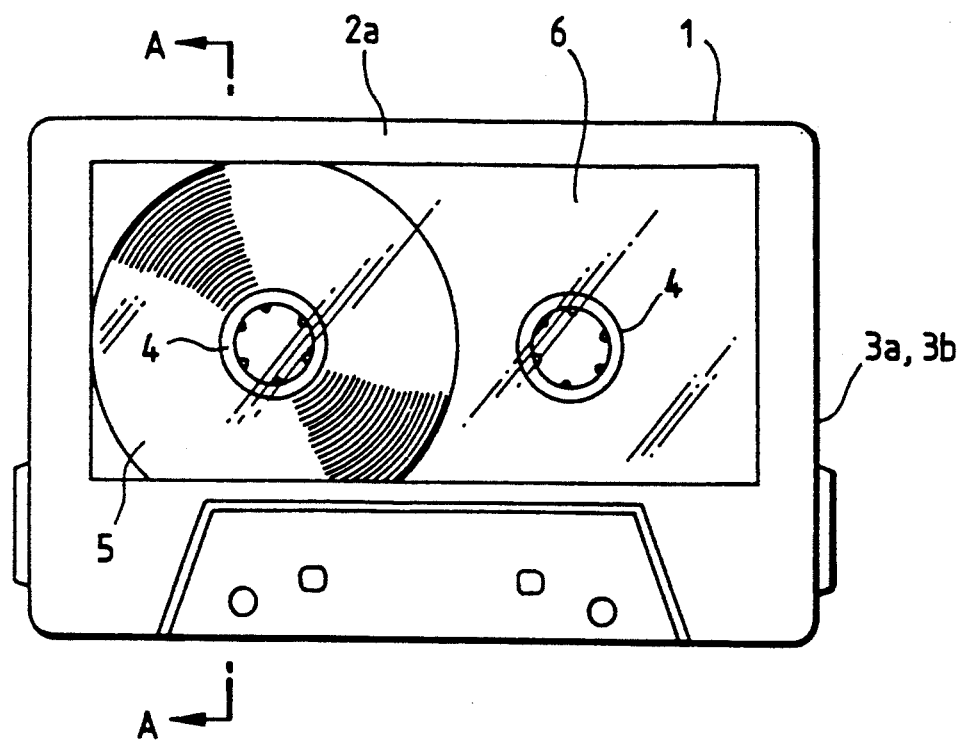
FIG. 8 is a plan view of a conventional magnetic tape cassette.
Figure 11:
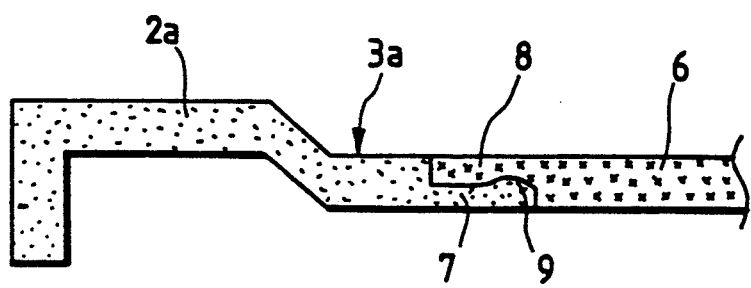
FIG. 11 is a cross-sectional view of a portion of an upper cassette half of the conventional audio compact cassette taken along a line intermediate the front and rear of the cassette.
Figure 9:
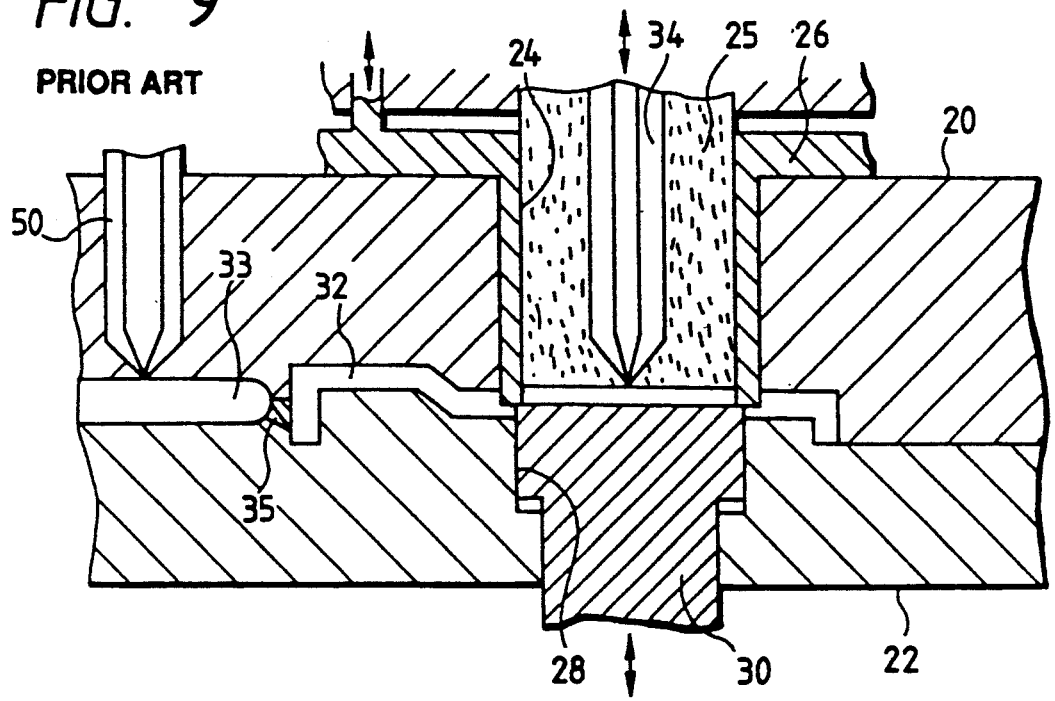
FIGS. 9 and 10 are cross-sectional views of a cassette half forming mold for the conventional magnetic tape cassette.
Figure 10:
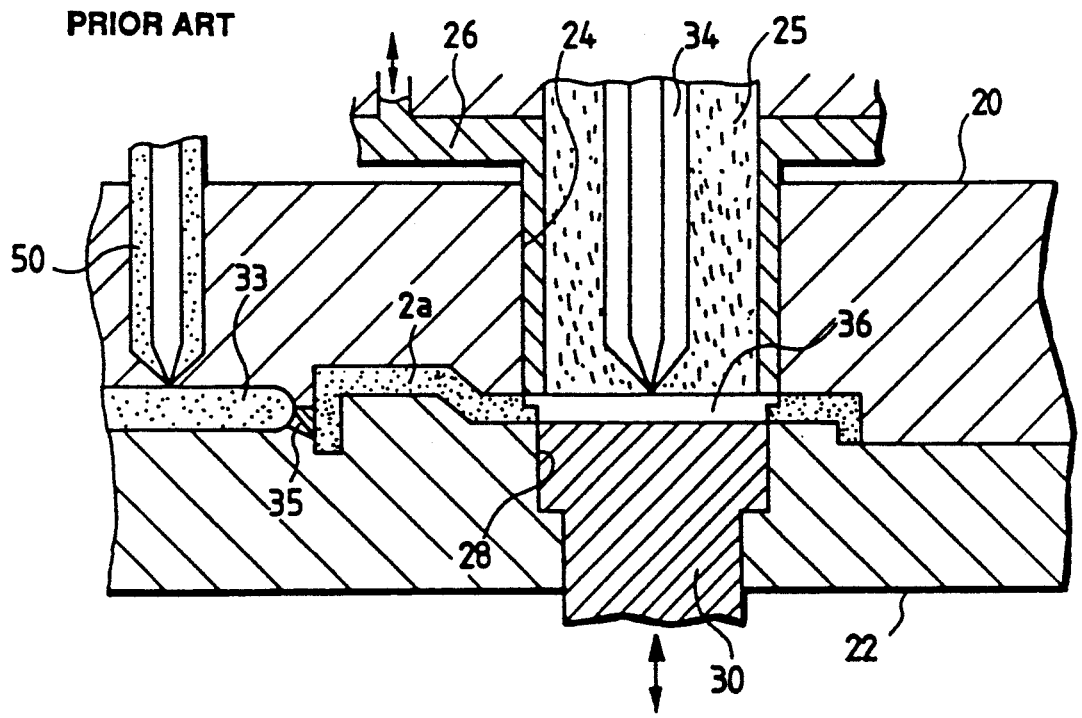

FIGS. 1 and 2 are cross-sectional views of a mold for molding a cassette half of a magnetic tape cassette. The magnetic tape cassette, comprising the half cassettes molded by this mold, has generally the same construction as that of the magnetic tape cassette shown in FIG. 8. This magnetic tape cassette is conventionally used widely in an audio unit and the like. A pair of hubs 4 on which a magnetic tape 5 is wound are rotatably housed in a case body 1 composed of upper and lower cassette halves 3a and 3b. The case body 1 is made of a plastics resin similar to that used in the prior art, and a window portion 6 and the cassette half body 2a (i.e., that portion other than the window portion 6) are formed by two-color molding using a core back method.

As shown in FIG. 1, the injection mold comprises a fixed mold member 20, a movable mold member 22, a slide cavity 26 provided in a slide hole 24 in the fixed mold member 20, a slide core 30 provided in a slide hole 28 in the movable mold member 22, and a gate block 25 provided in the slide cavity 26. A mold cavity 32 for individually molding the cassette halves 3a, 3b is formed in the mating surface between the fixed mold member 20 and the movable mold member 22. The slide cavity 25 and the slide core 30 for molding the window portion 6 are projected into the mold cavity 32, and the front end of the slide core 30 is adapted to be fitted in the slide cavity 26.

A submarine gate 35, communicating with a runner 33 and a primary hot runner 50 formed in the fixed mold member 20 for injecting a primary opaque resin, communicates with the mold cavity 32. Additionally, a secondary hot runner 34, formed in the gate block 25 inside the slide cavity 26 for injecting a secondary transparent resin, communicates with the mold cavity 32.

Figure 3:
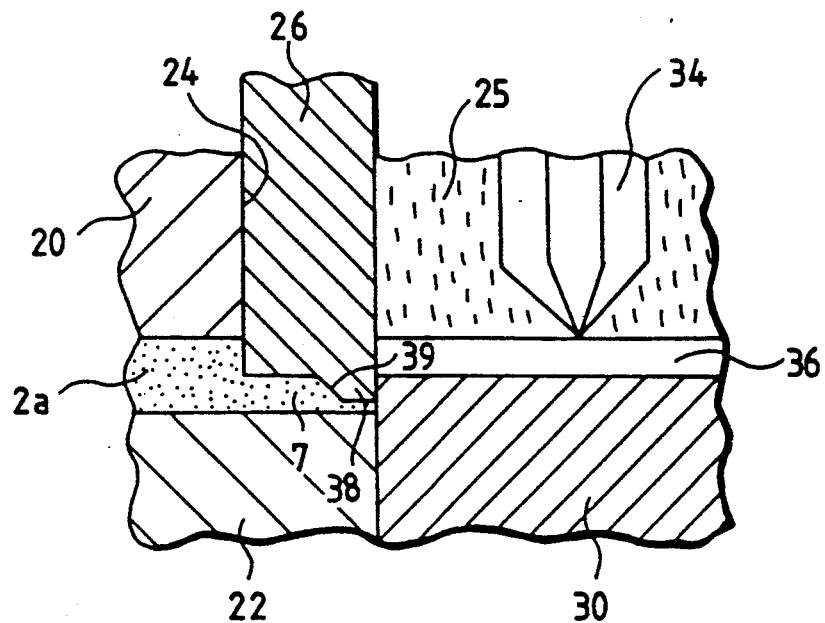
FIG. 3 is an enlarged cross-sectional view of a portion of the cassette half forming mold shown in FIGS. 1 and 2.

As shown in FIG. 3, a projection 38 for forming a tapered portion 39 on an edge of a step portion 7 (which supports the peripheral edge of the window portion 6) of the cassette half body 2a is formed on the end of the slide cavity 26 close to the mold cavity. The projection 38 projects in the direction of thickness of the mold cavity 32, and its projected end is flat. The peripheral surface of the projection 38 is tapered inwardly in the direction of the thickness of the mold cavity 32 so as to have a trapezoidal cross-section.

In the method of molding the cassette half body 2a, the mold cavity 32 is first formed by mating the fixed mold member 20 and the movable mold member 22 with each other, and the slide cavity 26 and the slide core 30 are abutted against each other by a hydraulic drive means (not shown). In this condition, the opaque primary injection resin is injected from the submarine gate 35 into the mold cavity 32. The primary injection resin thus injected is molded into a shape defined by the fixed mold member 20, the movable mold member 22, and slide cavity 26 and the slide core 30 to thereby provide the cassette half body 2a.

Then, to mold the window portion 6, after the primary injection resin is almost solidified, the slide cavity 25 and the slide core 30 are retracted respectively along the slide holes 24 and 28 to form a window cavity 36, as shown in FIG. 2. The retracted positions of the slide cavity 26 and slide core 30 in the slide holes 24 and 28 determine the thickness of the window portion 6. The slide cavity 26 and the slide core 30 are retracted respectively along the slide holes 24 and 28 in such a manner that the window 6 will have a thickness substantially equal to that of the cassette half body 2a. Particularly, the slide cavity is retracted until its end close to the mold cavity is brought into registry with the inner mold surface of the gate block 25 disposed at the thickness position of the window 6, and therefore the projection 38 projects into the window cavity 36.

Thereafter, the transparent secondary injection resin is injected from the secondary hot runner 34, provided in the gate block 25, into the window cavity 36 defined by the primary injection resin, the slide cavity 36 and the slide core 30, thereby integrally molding the cassette half 3a, 3b having the transparent window 6. At this time, since the tapered portion 39 is formed on the edge of the step portion 7 of the primary injection resin (the cassette half body 2a) forming the window cavity 36, the secondary resin can smoothly flow into the space for forming the peripheral edge portion 8 of the window portion 6. Therefore, the secondary resin, when injected, will not drag and deform the step portion 7, thus preventing the generation of drag The cassette half body 2a, molded by the primary injection, and the window portion 6, molded by the secondary injection, are thereafter welded together by the heat and injection pressure produced during the secondary injection molding, to thereby provide an integrally molded product. Then, when the injection material filled in the mold cavity 32 is cooled and solidified, the movable mole member 22 is opened, and the molded cassette half is removed from the mold.

Figure 4:
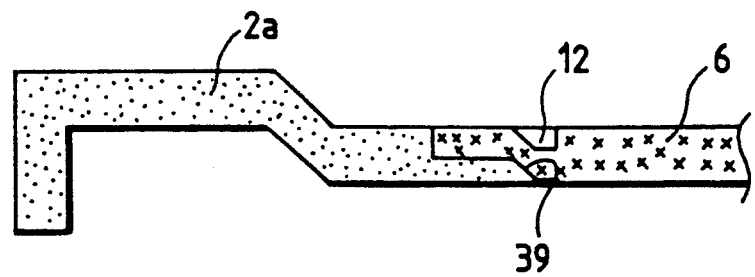
FIG. 4 is a cross-sectional view of a portion of an upper cassette half of an audio compact cassette taken along a line intermediate the front and rear of the cassette.

FIG. 4 is a cross-sectional view of a portion of the cassette half 3a formed by the above molding method. As can be seen, a groove 12 is formed in the outer surface of the window portion 6 by the projection 38 projecting into the window cavity 36.

Figure 5:
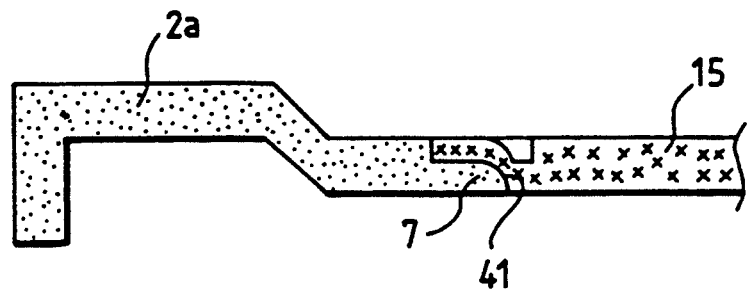
FIG. 5 is a cross-sectional view of a portion of another embodiment of an upper cassette half of an audio compact cassette of the present invention taken along a line intermediate the front and rear of the cassette.
Figure 6:
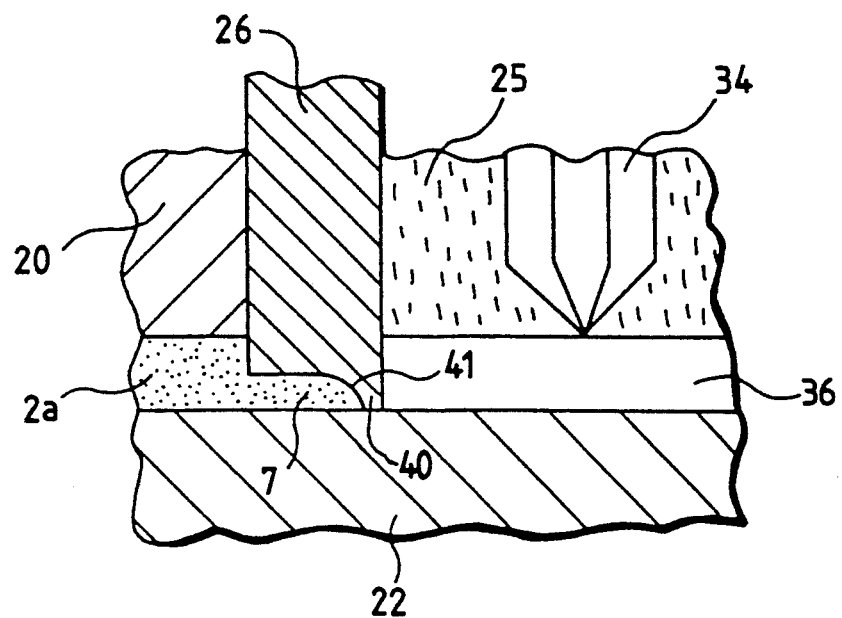
FIG. 6 is a cross-sectional view of a cassette half-forming mold for a magnetic tape cassette according to a further embodiment of the present invention.

The inclined portion formed on the edge of the step portion 7 is not limited to the tapered portion 39 described in the above embodiment, and may be a convexly-curved portion 41 as shown in FIGS. 5 and 6. As shown in FIG. 6, the curved portion 41 is formed by a projection 40 having a concavely-curved peripheral surface. The peripheral surface of the projection 40 may be a convexly-curved surface, in which case the inclined portion formed on the edge of the step portion 7 has a concavely-curved shape. Further, as shown in FIG. 6, by abutting a slide cavity 26, having the above projection 40, against a movable mold member 22 to form a window cavity 36, the need for the slide core 30 is obviated. In this case, by forming the distal end of the projection 40 into a substantially flat surface, fracture of the projection 40 can be prevented.

Figure 7:
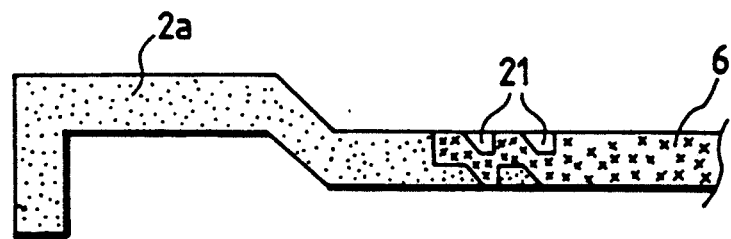
FIG. 7 is a cross-sectional view of a portion of a further embodiment of an upper cassette half of an audio compact cassette of the present invention taken along a line intermediate the front and rear of the cassette.

According to a further embodiment, two projections are formed on the end of the slide cavity 26 close to the mold cavity. By doing so, two inclined portions are formed on the edge of the step portion 7 so that the secondary resin can smoothly flow into the space for forming the peripheral edge portion 8 of the window portion 6, as illustrated in FIG. 7. FIG. 7 is a cross-sectional view of a portion of the cassette half 3a formed by this molding method, and, as can be seen, grooves 21 are formed in the outer surface of the window portion 6 by the two projections projected into the window cavity 36.

In the above embodiments, although the methods of molding the audio compact cassette have been described, the present invention is not limited to these specific embodiments, and the invention can, of course, be applied to various magnetic tape cassettes molded by multi-color (at least two colors) molding.

As described above, in the magnetic tape cassette of the present invention, the step portions for supporting at least part of the peripheral edge of the window portion in the direction of the thickness of the cassette are formed respectively on the cassette half body and the window portion. The cassette half body and the window portion are molded integrally with each other by multi-color molding, and the primary molding is carried out in such a manner that the inclined portion is formed on the edge of the step portion of the primary resin defining part of the mold cavity for injection-molding the secondary resin. Subsequently, the secondary resin is injection-molded into the mold cavity, thereby integrally molding the cassette half.

Therefore, when the secondary resin is to flow into the space for forming the peripheral edge of the window portion laminated on the primary resin, the secondary resin can smoothly flow thereinto along the inclined portion, and therefore the drag which drags and deforms the step portion is prevented from occurring.

Therefore, there can be provided the magnetic tape cassette-molding method and the magnetic tape cassette, in which the drag is prevented from developing at the laminated portion of the secondary and primary resins during the two-color molding of the cassette half, thereby preventing a defect of the appearance.

What is claimed is:

1. A magnetic tape cassette, comprising:
   first and second cassette halves secured together in mating relation and rotatably supporting a pair or reel hubs which are rotatable about axes extending in an axial direction, at least one of said cassette halves having a window opening therein; and
   a window portion secured in said window opening of said one cassette half, wherein said one cassette half and the outer periphery of said window portion respectively have complementary step portions at which said window portion is adhered to said one cassette half, said step portion having an inclined portion which is inclined into the cassette with respect to said axial direction or a convexly curved portion formed thereon and sloping into the cassette.

2. The magnetic tape cassette of claim 1 wherein said step portion of said one cassette half has two inclined portions or convexly curved portions formed on an edge thereof.

* * * * *